(12) United States Patent  (10) Patent No.: US 9,231,750 B2
Milton                     (45) Date of Patent:     Jan. 5, 2016

(54) LOW-POWER, LOW-LATENCY ARCHITECTURE FOR TELECOM AND DATACOM MULTIPLEXERS AND DEMULTIPLEXERS

(71) Applicant: Semtech Corporation, Camarillo, CA (US)

(72) Inventor: Paul Spencer Milton, San Diego, CA (US)

(73) Assignee: Semtech Corporation, Camarillo, CA (US)

( * ) Notice: Subject to any disclaimer, the term of this patent is extended or adjusted under 35 U.S.C. 154(b) by 475 days.

(21) Appl. No.: 13/800,914

(22) Filed: Mar. 13, 2013

(65) Prior Publication Data

US 2015/0312022 A1    Oct. 29, 2015

(51) Int. Cl.
*H04J 3/06*      (2006.01)
*H04L 7/00*      (2006.01)

(52) U.S. Cl.
CPC ................................. *H04L 7/0016* (2013.01)

(58) Field of Classification Search
CPC .................................................... H04L 7/0016
USPC ................................................................ 370/503
See application file for complete search history.

(56) References Cited

U.S. PATENT DOCUMENTS

| | | | | |
|---|---|---|---|---|
| 7,474,612 B1* | 1/2009 | Patel | ....................... | H04J 3/062 370/217 |
| 8,781,147 B1* | 7/2014 | Giuroiu | ................ | H04R 1/1091 381/309 |
| 2002/0027962 A1* | 3/2002 | Muller | ................... | H03G 5/005 375/316 |
| 2002/0075529 A1* | 6/2002 | Sato | ..................... | H04N 1/00236 358/505 |
| 2003/0179771 A1* | 9/2003 | Chan | ....................... | H04L 12/26 370/445 |
| 2005/0019036 A1* | 1/2005 | Soto | ...................... | H04J 3/1694 398/135 |
| 2007/0123192 A1* | 5/2007 | Sinai | ................... | H04M 1/6066 455/403 |
| 2007/0230640 A1* | 10/2007 | Bryan | ............... | H04L 25/03878 375/349 |
| 2008/0117984 A1* | 5/2008 | Hao | ....................... | G09G 5/006 375/240.26 |
| 2008/0285694 A1* | 11/2008 | Lee | ...................... | H03L 7/0812 375/355 |
| 2011/0032632 A1* | 2/2011 | Erden | ............. | G11B 20/10009 360/51 |
| 2011/0060894 A1* | 3/2011 | Graef | .................... | G06F 1/3287 712/229 |
| 2012/0070004 A1* | 3/2012 | LaBosco | ................ | H04H 20/30 381/2 |
| 2012/0275784 A1* | 11/2012 | Soto | ................... | H04B 10/2503 398/38 |
| 2013/0197920 A1* | 8/2013 | Lesso | .................. | H04L 25/4902 704/500 |
| 2015/0002068 A1* | 1/2015 | Durham | ................ | H02M 7/539 318/503 |

* cited by examiner

*Primary Examiner* — Melvin Marcelo
*Assistant Examiner* — Peter Solinsky
(74) *Attorney, Agent, or Firm* — Amin, Turocy & Watson, LLP

(57) ABSTRACT

Described herein are systems and methods for reducing power consumption, latency, and chip complexity in a datacom/telecom multiplexer and demultiplexer. Adding a high frequency analog domain data path around or in place of a standard digital core data path allows the elimination of the demultiplexing and multiplexing stages required to drop the data rate of data streams down to that required for a standard digital core. Latency is also reduced due to the higher operating frequency of sequential elements required for data operations. The digital core can be powered down when not in use, and can be activated when necessary.

20 Claims, 7 Drawing Sheets

LOW-POWER, LOW-LATENCY ARCHITECTURE FOR TELECOM AND DATACOM MULTIPLEXERS AND DEMULTIPLEXERS

TECHNICAL FIELD

This disclosure generally relates to a low power, low latency architecture for telecom and datacom multiplexers and demultiplexers.

BACKGROUND

Datacom and telecom multiplexers and demultiplexers send and receive many high speed serial data streams. This data is traditionally passed through standard Synthesized and Placed and Routed digital cores. To pass the high speed data through the digital core, the data-rate must be dropped significantly. The multiplexing and demultiplexing stages that drop the data rate use additional power and increase the latency of the data through the design. Designs that use a standard place and route digital core can be non-optimized and inefficient with large layout areas and high parasitics when compared to custom schematic based design.

The above-described deficiencies of datacom and telecom multiplexers and demultiplexers are merely intended to provide an overview of some problems of current technology, and are not intended to be exhaustive. Other problems with the state of the art, and corresponding benefits of some of the various non-limiting implementations described herein may become further apparent upon review of the following detailed description.

SUMMARY

The following presents a simplified summary to provide a basic understanding of some aspects of the subject disclosure. This summary is not an extensive overview of the disclosed subject matter. It is not intended to identify key or critical elements of the disclosed subject matter, nor is it intended to delineate the scope of the subject disclosure. Its sole purpose is to present some concepts of the disclosed subject matter in a simplified form as a prelude to the more detailed description presented later.

In one embodiment of the subject disclosure, a circuit includes a set of analog front-ends, clock data recovery circuits and demultiplexers that receives data streams and a digital core data path with an analog multiplexer and demultiplexer. An analog domain data path that bypasses the data streams around the digital core data path to a multiplexer with a higher data rate data output is also included. The digital core data path is also powered down in response to the analog domain data path being used in a normal or low power mode.

In another implementation of the subject disclosure, a circuit includes a set of clock data recovery circuits and demultiplexers that receives high data rate input data streams. A digital core data path with an analog multiplexer and demultiplexer is also included. The circuit also has an analog domain data path that bypasses the data streams around the digital core data path to a multiplexer that outputs the data streams at a lower data rate than the input data streams. The digital core data path is powered down in response to the analog domain data path being used in a normal mode.

In another implementation of the subject disclosure, a method includes receiving a first set of data streams at a set of clock data recovery circuits and demultiplexers and directing the first set of data streams through an analog domain data path. The method also includes passing a data stream that requires substantial digital processing to a digital core data path, and powering down the digital core data path when it is not in use. The method also includes outputting a second set of data streams from the analog domain data path and a multiplexer wherein a data rate of the second set of data streams is different than a data rate of the first set of data streams.

The following description and the annexed drawings set forth in detail certain illustrative aspects of the disclosed subject matter. These aspects are indicative, however, of but a few of the various ways in which the principles of the innovation may be employed. The disclosed subject matter is not intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive implementations of the subject disclosure are described with reference to the following figures, wherein like reference numerals refer to like parts throughout the various views unless otherwise specified.

DETAILED DESCRIPTION

Figure 1:
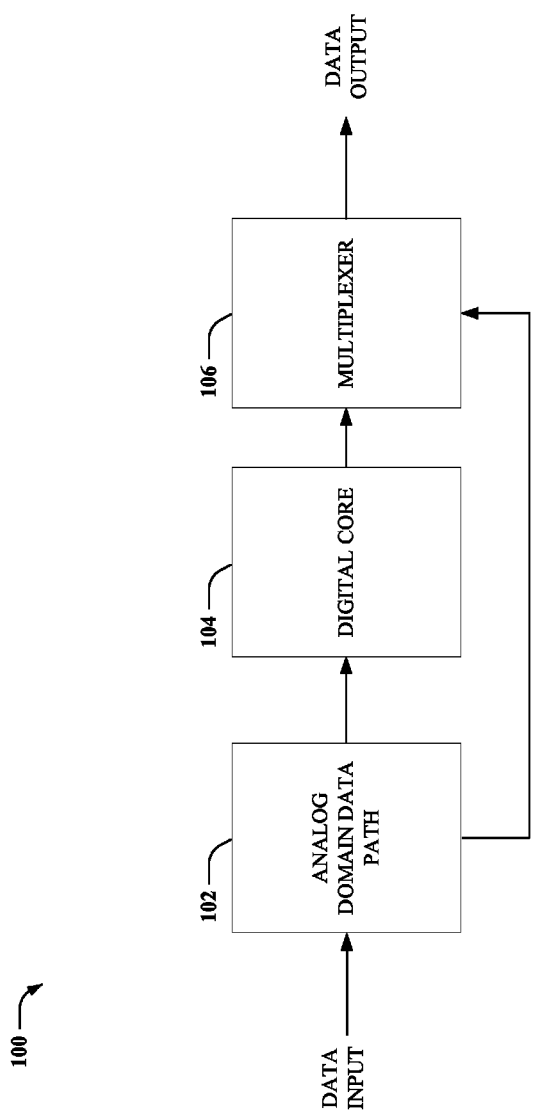
FIG. 1 is a block diagram illustration of a multiplexer circuit, according to an implementation of the subject disclosure.

In the following description, numerous specific details are set forth to provide a thorough understanding of the implementations of the subject disclosure. One skilled in the relevant art will recognize, however, that the implementations described herein are practiced without one or more of the specific details, or with other methods, components, materials, etc. In other instances, well-known structures, materials, or operations are not shown or described in detail to avoid obscuring certain aspects.

According to an aspect of the subject disclosure, described herein is a circuit architecture that allows for reduced power consumption and data latency through the addition of a high frequency analog domain data path around or in place of the standard digital core data path. The new data path is in addition to standard analog domain demultiplexing and multiplexing. In some embodiments, the analog domain data path is implemented using low power static CMOS although use of other logic styles is possible. Both power and latency can be reduced by eliminating the multiplexing and demultiplexing stages required to drop the data rate to that required for a standard Synthesized and Place and Routed digital core. The latency of the circuit can also be reduced due to the higher operating frequency of sequential elements required for data operations.

In some embodiments of the subject disclosure, moving the normal/low power mode data path to the analog domain allows for efficient schematic design and layout to optimize the logic and reduce layout area and parasitics. Highly accurate analog domain parasitic extraction and simulation allows use of standard digital library cells at much higher data rates than in a traditional digital flow, and the analog approach disclosed herein can accommodate customized high performance cells where necessary. Additionally, implementing only necessary normal or low power mode features in the analog domain data path allows for small clock trees, short traces, and minimal sequential elements that combine to reduce power and latency. In some embodiments, analog domain design allows the use of asynchronous design techniques as opposed to having clock signals driving the clock ports of sequential elements. These asynchronous design techniques can reduce the power consumption of the circuit.

In some embodiments, a traditional digital core is maintained with chip and link diagnostics, calibration, serial interface, and other high gate count functions. The digital core can be simplified however, as only one data path clock domain is required as the data to the digital core is tapped and demultiplexed after an analog domain First In First Out ("FIFO") structure. In some embodiments, these digital core functions are powered down unless required, so most of the time only the highly efficient analog data path is running.

In some embodiments, the analog domain data path contains the FIFO structure (to transition data from the recovered clock domain or domains to a common or data output clock domain), the data processing required for the through-data, and a demultiplexer and multiplexer (which can be powered down) to accommodate the lower data-rate used by the digital core. Analog domain implementation also allows for reduced power through the clock and data gating of logic not required in specific modes just as in a standard digital flow.

In some embodiments of the subject disclosure, running the FIFO structure at a high rate (low divide ratio of the serial receive data) allows the clock data recovery ("CDR") circuits and demultiplexers to operate without synchronization between channels which reduces design complexity and power. The high rate FIFO structure also allows each receive channel to be asynchronous with respect to the other receive channels both with divider chains that don't require synchronization and with FIFO write pointers that don't require synchronized reset de-assertion.

In an example embodiment, the removal of synchronization results in increased skew between channels. When the FIFO is operated at low data rates, used during standard digital flow through the digital core, the skew can exceed predetermined limits, forcing use of synchronization between channels or deskew to remove the excess added skew. At high speeds, as used in the analog domain approach disclosed herein, larger margins of acceptable skew are realized.

Turning now to FIG. 1, a block diagram illustration of a multiplexer circuit, according to an implementation of the subject disclosure is shown. Multiplexer circuit 100 includes an analog domain data path 102, a digital core data path 104, and a multiplexer 106.

The analog domain data path 102 receives data and associated clock inputs and can transition the data inputs from their respective clock domains to a data output clock domain. In some embodiments, the analog domain data path 102 receives the high data rate data buses with associated clocks from analog front-ends, CDR circuits and demultiplexers that receive the data streams from an external source. The analog domain data path 102 includes data path logic that maps channels on the data output clock domain to a different ordering of lines per packet from ten packets with 16 lines to 4 packets with 40 lines each. Multiplexer 106 can be a non-power of two multiplexer that multiplexes the 40 lines per packet down to 1 line. In some embodiments, ten data input streams can be received by the multiplexer circuit 100 and four data streams can be outputted. Due to the reduced number of data streams exiting the analog domain data path 102, the multiplexer 106 has data outputs with a higher data rate than the data inputs received by the clock data recovery circuits. Similarly, there are a higher number of input data streams received by the analog domain data path 102 than the number of data streams outputted by analog domain data path 102.

The analog domain data path 102 can bypass the data streams around the digital core data path 104 to a multiplexer 106 when being used in a normal/low power mode. When the digital core data path 104 is bypassed, latency is reduced and power is saved since the step of demultiplexing and multiplexing down to the digital core data path 104's data rate is skipped. Latency is also reduced due to the higher operating rate of the sequential data operations in the analog domain data path 102 compared to the operating rate of the digital core data path 104.

In some embodiments, power can be saved by powering down all of, or a portion of the digital core data path 104 when the digital core data path is bypassed. The portions of the analog domain data path 102 and the multiplexer 106 that are used to demultiplex and multiplex the datastreams passing through the digital core data path are not needed when bypassing the digital core data path 104. Accordingly, those portions can be powered down as well.

In some embodiments, analog domain data path 102 can pass one or more of the data streams through the digital core data path 104 when necessary. The demultiplexer on analog domain datapath 102 and the multiplexer on multiplexer 106 can be powered on to facilitate the datastreams passing through the digital core data path 104. In these embodiments, the digital core data path 104 performs chip and link diagnostics as well as perfoming calibration tasks when the digital core data path 104 is activated. Even when the digital core data path 104 is activated, and one or more data streams are being passed into it, analog domain data path 102 still bypasses digital core data path 104 with the data streams that do not need substantial digital processing.

Figure 2:
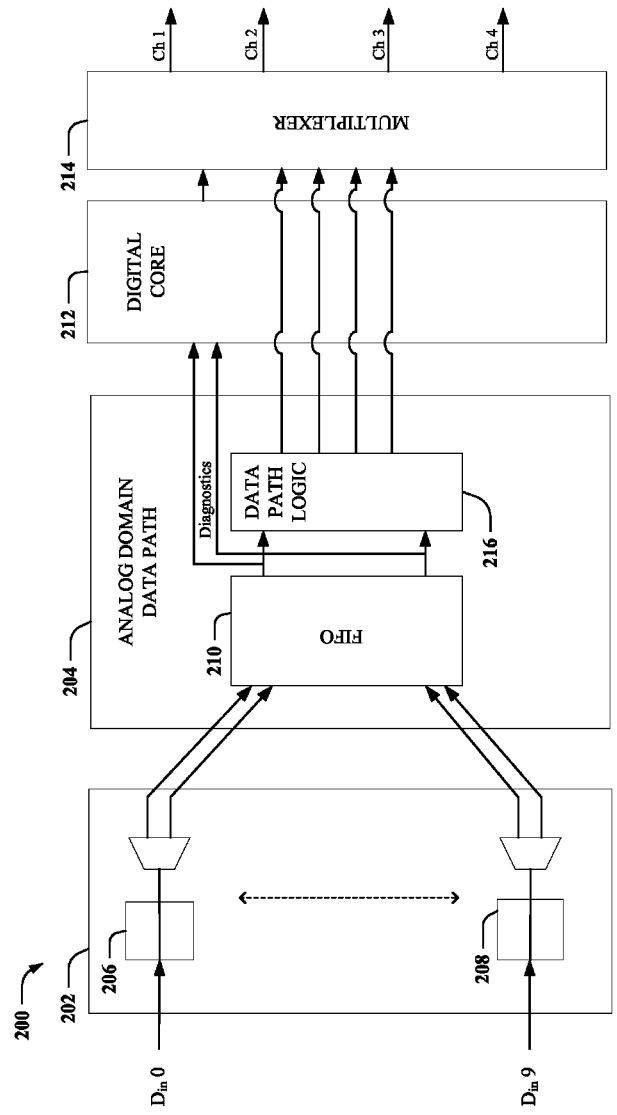
FIG. 2 is a schematic illustration of a multiplexer circuit, according to an implementation of the subject disclosure.

Turning now to FIG. 2, a schematic illustration of a multiplexer circuit, according to an implementation of the subject disclosure is shown. System 200 includes CDR circuit and demultiplexer set 202, an analog domain data path 204, a digital core data path 212, and a multiplexer 214. The schematic illustration displayed in FIG. 2, shows in more detail the block diagram illustrated in FIG. 1.

In an embodiment, CDR circuit and demultiplexer set 202 includes a CDR circuit for each incoming data stream. As an example, in FIG. 2, there are ten incoming data streams, $D_{in}$ 0 to $D_{in}$ 9 served by CDR circuits 206-208 and associated demultiplexers. In other embodiments, the CDR circuit and demultiplexer set 202 can have fewer than ten incoming data streams, or greater than ten incoming data streams. Demultiplexers following the CDR circuits 206 and 208 are also included to reduce the data rate and divide the associated clock as appropriate before being sent to the analog domain data path 204.

A data bus and associated recovered and divided clock for each serial input data stream are sent to a FIFO 210 on analog domain data path 204. The FIFO 210 transitions the data buses from a plurality of recovered clock domains to a common or data output clock domain. Each CDR/Demux channel can be treated completely independently from the other channels. Timing closure only requires that the data is captured in the FIFO 210 with the associated clock. This greatly simplifies the chip-level timing closure.

In some embodiments, the analog domain data path 204 is implemented using low power, static CMOS. In other embodiments, the analog domain data path 204 can be implemented using SCL, ECL, or BiCMOS.

Data path logic 216 on analog domain data path 204 can map the ten data channels into four data channels. In the embodiment shown in FIG. 2, data path logic 216 contains non-power of two mapping logic, in this particular case, 10:4 mapping. In other embodiments, different ratios are possible. After being mapped by the data path logic 216, the data streams can be forwarded to multiplexer 214, bypassing the digital core and eventually outputted.

In some embodiments, one or more of the data streams can be tapped and demultiplexed after passing through the FIFO 210. The data streams can be demultiplexed to a much lower data rate allowing the data streams to be passed into the digital core data path 212. The data streams can be sent to the digital core data path 212 only when necessary, such as for calibration, or diagnostic purposes. When the digital core data path 212 is not in use, it is powered down. The demultiplexer in the analog domain datapath 204 that taps and demultiplexes the data streams can be powered down as well. Clock and data gating in the analog and digital circuitry can also reduce power, as disabling portions of the circuitry save power. Different portions of the circuitry can be gated based on the mode of the analog domain data path.

The FIFO 210 is operated at a rate sufficiently high that the circuitry associated with any data stream can be implemented in isolation from the circuitry associated with all other input data streams while limiting additive channel to channel skews. Treating all channels independently before the common clock domain reduces design complexity. Specifically, the high data rate FIFO 210 also allows each receive channel to be asynchronous with respect to the other receive channels both with CDRs and clock divider chains that don't require synchronization and with FIFO write pointers that don't require synchronized reset de-assertion. The FIFO 210 can absorb wander between the receive and transmit channels and since it is operated at a low divide ratio, the FIFO 210 can also keep skew limited to an amount that is acceptable.

In some embodiments, since the data does not need to travel through the core, there can be a digital split into two data clock domains, an input (checker) domain and an output (generated) domain. This eases the chip-level timing closure. In some embodiments, data must travel through the core, so one digital clock domain is possible.

At the multiplexer 214, the data streams that have been received directly from the analog domain data path 204 can be combined with the data streams passed through the digital core data path 212.

Figure 3:
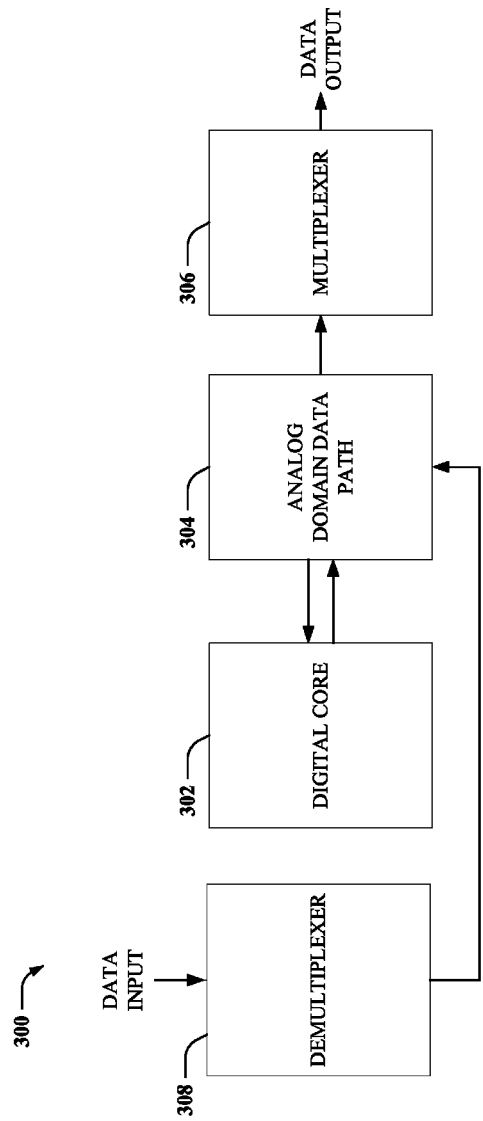
FIG. 3 is a block diagram illustration of a demultiplexer circuit, according to an implementation of the subject disclosure.

Referring now to FIG. 3, a block diagram illustration of a demultiplexer circuit, according to an implementation of the subject disclosure is shown. Demultiplexer circuit 300 includes a demultiplexer 308, a digital core data path 302, an analog domain data path 304, and a multiplexer 306.

The analog domain data path 304 receives data and associated clock inputs and can transition the data inputs from their respective recovered clock domains to a common data output clock domain. In some embodiments, the analog domain data path 304 receives the high data rate data buses with associated clocks from a CDR circuit and demultiplexer 308 that receives the data streams from an external source. The analog domain data path 304 can include data path logic that maps the data input streams into a larger number of data output streams on a non-power of two basis. In some embodiments, four packets with 40 bits or lines can be mapped to 16 packets with 10 bits or lines by data path logic in analog data path 304. Demultiplexer 308 can be a non-power of two demultiplexer to generate the 40 bit wide buses from the outputs of the CDR circuits.

The analog domain data path 304 can bypass the data streams around the digital core data path 302 to a multiplexer 306 when being used in a normal mode. When the digital core data path 302 is bypassed, latency is reduced and power is saved since the step of demultiplexing and multiplexing down to the digital core data path 302 data rate is skipped. Latency is also reduced due to the higher operating rate of the sequential data operations in the analog domain data path 304 compared to the operating rate of the digital core data path 302.

In some embodiments, power can be saved by powering down all of, or a portion of the digital core data path 302 when the digital core data path is bypassed. The portions of the analog domain data path 304 that are used to demultiplex and multiplex the datastreams passing through the digital core data path are not needed when bypassing the digital core data path 302. Accordingly, those portions can be powered down as well.

In some embodiments, analog domain data path 304 can pass one or more of the data streams to the digital core data path 302 when necessary. A multiplexer and demultiplexer on analog domain datapath 304 can be powered on to facilitate the datastreams passing to and from the digital core data path 302. In these embodiments, the digital core data path 302 performs chip and link diagnostics as well as performing calibration tasks when the digital core data path 302 is activated. The digital core data path 302 can also perform deskewing as needed for the data streams. Even when the digital core data path 302 is activated, and one or more data streams are being passed through it, analog domain data path 304 still bypasses digital core data path 302 with the data streams that do not need digital processing.

Figure 4:
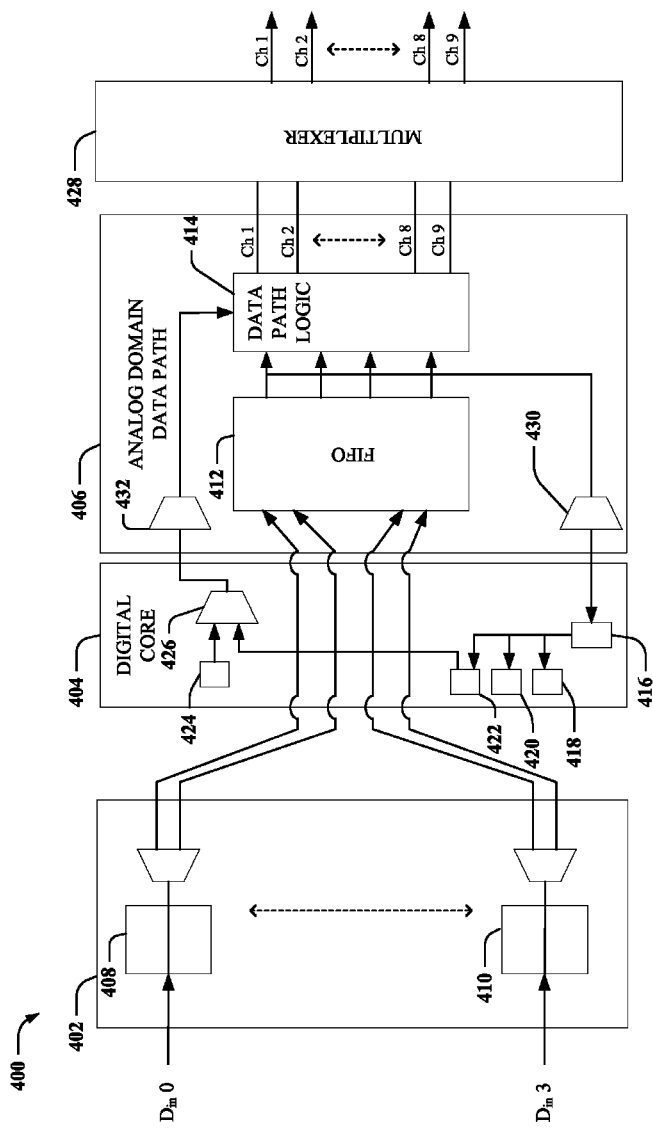
FIG. 4 is a schematic illustration of a demultiplexer circuit, according to an implementation of the subject disclosure.

With reference now to FIG. 4, a schematic illustration of a demultiplexer circuit, according to an implementation of the subject disclosure is shown. System 400 includes a CDR circuit and demultiplexer set 402, an analog domain data path 406, a digital core data path 404 and a multiplexer 428. The schematic illustration displayed in FIG. 4 shows in more detail the block diagram illustrated in FIG. 3.

In an embodiment, CDR circuit and demultiplexer set 402 includes a CDR circuit for each incoming data stream. As an example, in FIG. 4, there are four incoming data streams, $D_{in}$ 0 to $D_{in}$ 3 served by CDR circuits 408 and 410 and associated demultiplexers. In other embodiments, the CDR circuit and demultiplexer set 402 can have fewer than four incoming data streams, or greater than four incoming data streams. CDR circuits 408 and 410 can include components to detect the phases and data rates of the incoming data streams and use that information to generate recovered clocks which retime the serial data streams to generate clean digital data signals. The non power of two demultiplexer following the CDR reduces the data rate while producing multiple data bits. Four channels are generated, each comprising 40 lines along with four associated clocks. These four channels on separate clock domains go into the FIFO 412 and 160 lines are outputted by the FIFO 412. The 160 lines are reordered or mapped from four packets of 40 lines to ten packets of 16 lines by the data path logic 414.

In some embodiments, the analog domain data path 406 is implemented using low power, static CMOS. In other embodiments, the analog domain data path 406 can be implemented using SCL, ECL, or BiCMOS.

In the embodiment shown in FIG. 4, data path logic 414 contains a non-power of two mapper. In other embodiments, different ratios are possible, as well as having a demultiplexer that is a power of two demultiplexer. After being mapped by the data path logic 414, the data streams can be forwarded to multiplexer 428, skipping the digital core and eventually outputted.

In some embodiments, one or more of the data streams can be tapped and demultiplexed after passing through the FIFO 412. The data streams can be slowed to a much lower data rate allowing the data streams to pass through the digital core data path 404. The data streams can be sent to the digital core data path 404 only when necessary, such as for calibration and diagnostic tests and for deskewing. When the digital core data path 404 is not in use, it is powered down. The demultiplexer 430 in the analog domain datapath 406 that taps and demultiplexes the data streams can be powered down as well as the multiplexer 432. Clock and data gating in the analog and digital circuitry can also reduce power, as disabling portions of the circuitry save power. Different portions of the circuitry can be gated based on the mode of the analog domain data path.

Digital core data path 404 can include a data path logic component 416 as well as chip and link diagnostics 418 and 420. A deskew component 422 can be activated and begin deskewing data streams in response to a deskew mode bit being turned on. The deskew component 422 can pass the data to a multiplexer 426 that selects either the digital data from data generation component 424 or the analog domain stream. The multiplexer than passes the selected stream back to the data path logic 414 on analog domain data path 406.

Figure 5:
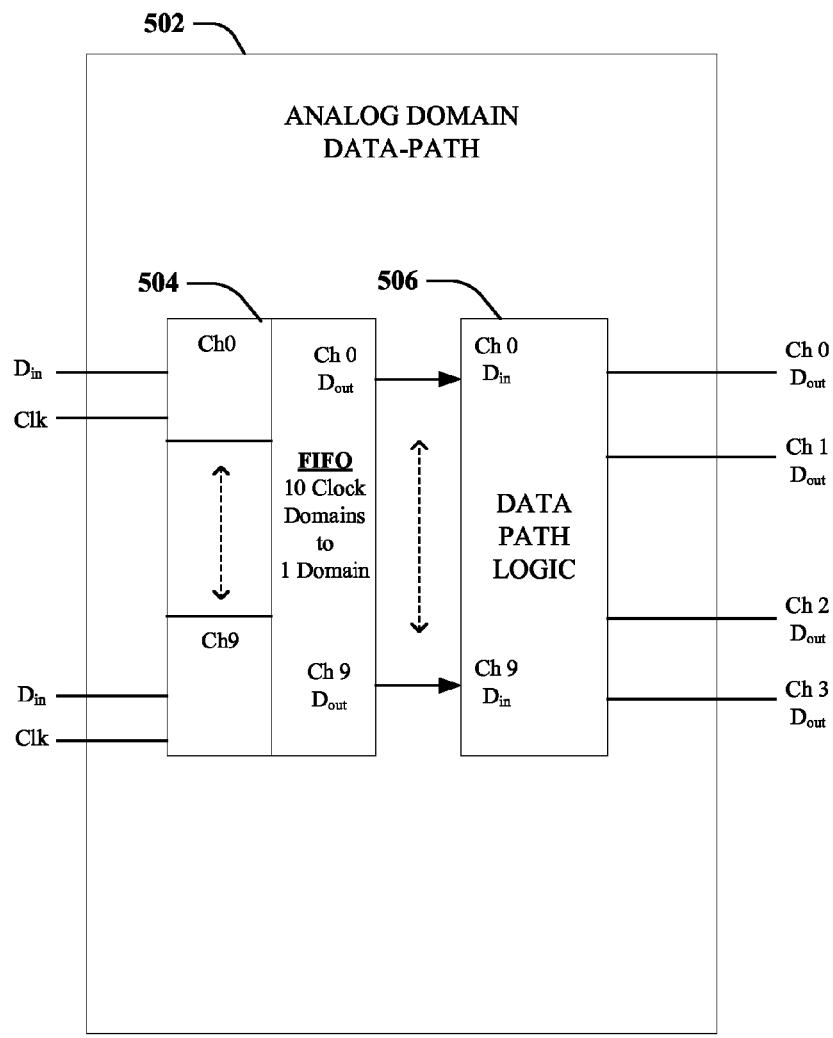
FIG. 5 is a schematic illustration of an analog domain data path, according to an implementation of the subject disclosure.

Turning now to FIG. 5, a schematic illustration 500 of an analog domain data path 502, according to an implementation of the subject disclosure is shown. Analog domain data path 502 includes a FIFO 504 that receives data inputs and transitions data from the plurality of recovered clock domains to a common or data output clock domain. Each data input channel can be treated completely independently from the other channels. Timing closure only requires that the data is captured in the FIFO 504 with the associated clock.

The FIFO 504 is operated at a rate sufficiently high that the circuitry associated with any data stream can be implemented in isolation from the circuitry associated with all other input data streams while limiting additive channel to channel skew. Treating all channels independently before the common clock domain reduces design complexity. Specifically, the high data rate FIFO 504 also allows each receive channel to be asynchronous with respect to the other receive channels both with CDRs and clock divider chains that don't require synchronization and with FIFO write pointers that don't require synchronized reset de-assertion. The FIFO 504 can absorb wander between the receive and transmit channels and since it is operated at a low divide ratio, the FIFO 504 can also keep skew limited to an amount that is acceptable.

The FIFO 504 passes the data channels to data path logic 506 which can map the data streams from ten input streams to four output streams. In the embodiment shown in FIG. 5, data path logic 506 can map channels in a 10:4 gearbox ratio. In other embodiments, different gearbox ratios are possible, as well as power of two mapping. After being mapped by the data path logic 506, the data streams can be forwarded to another multiplexer before being outputted.

Figure 6:
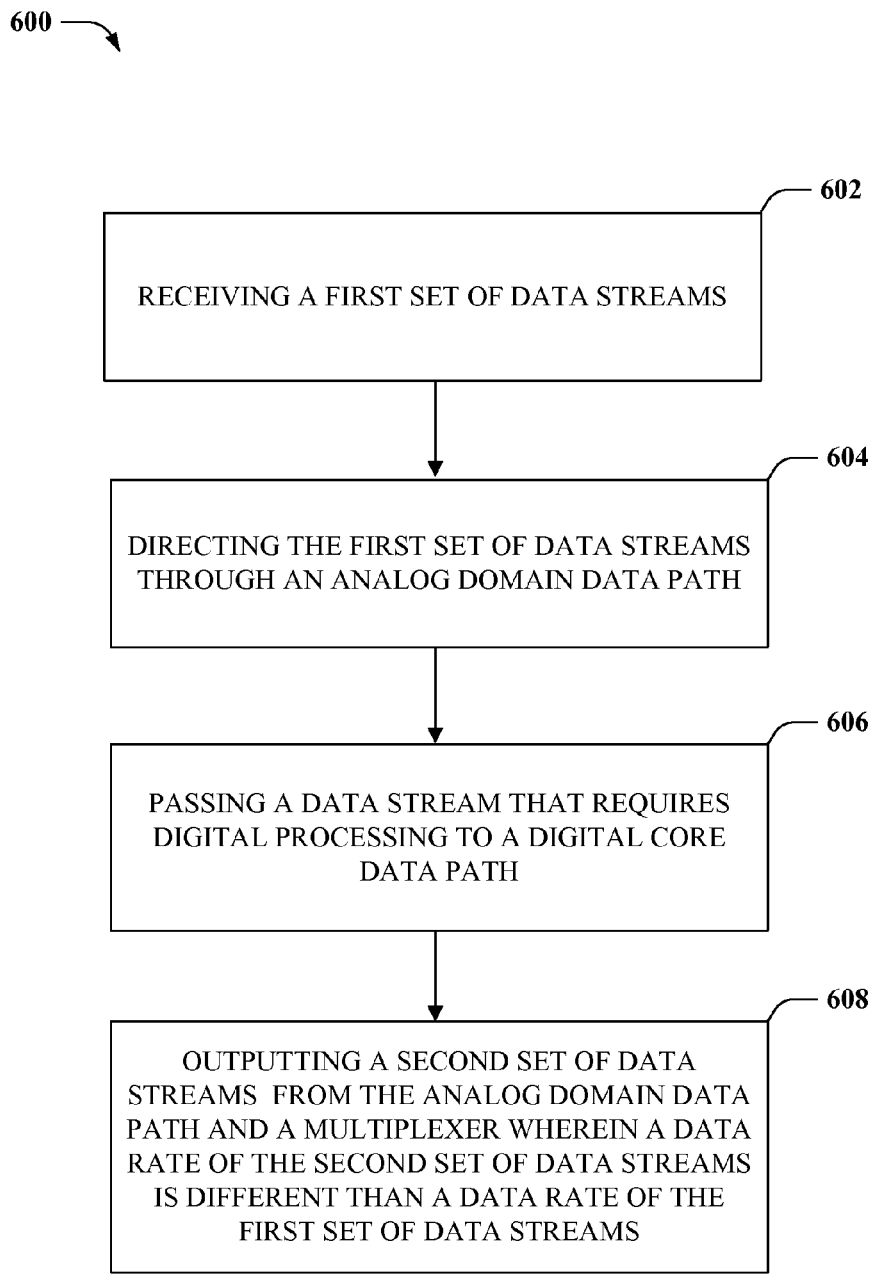
FIG. 6 is a schematic process flow diagram of a method for multiplexing and demultiplexing data streams, according to an implementation of the subject disclosure.
Figure 7:
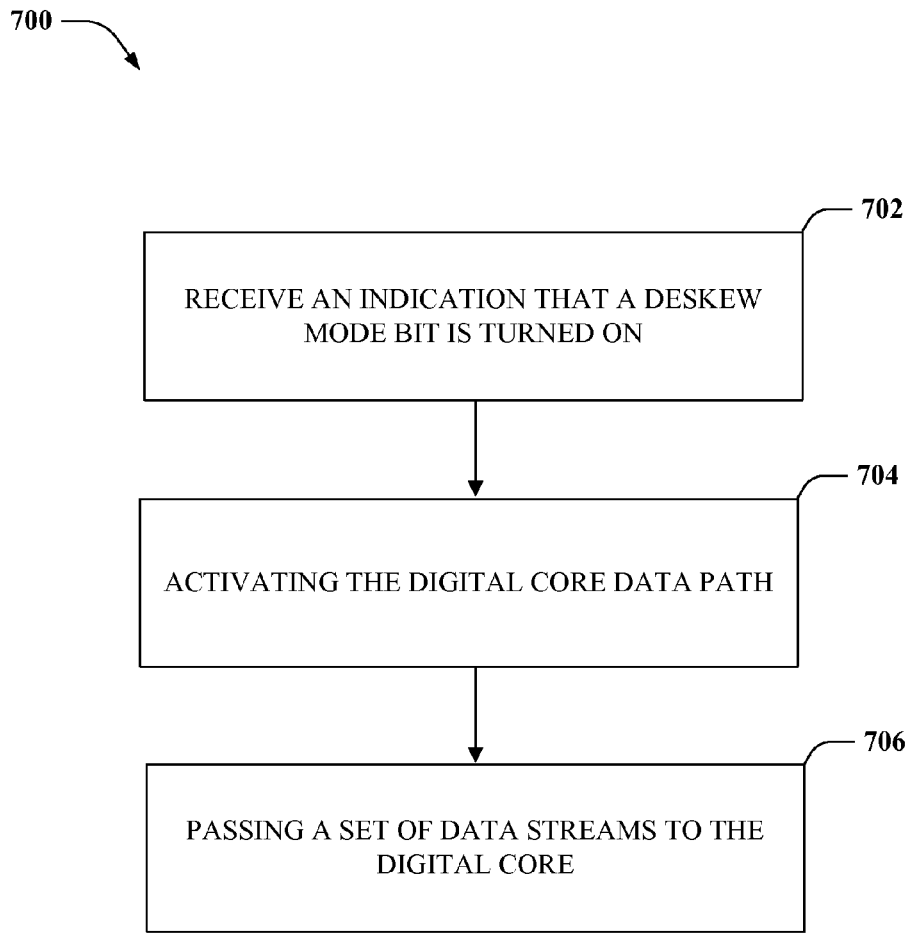
FIG. 7 is a schematic process flow diagram of a method for deskewing data streams, according to an implementation of the subject disclosure.

FIGS. 6-7 show methods illustrated as flow diagrams. For simplicity of explanation, the methods are depicted and described as series of acts. However, the methods are not limited by the acts illustrated and by the order of acts. For example, acts can occur in various orders and/or concurrently, and with other acts not presented and described herein. Furthermore, not all illustrated acts may be required to implement the methods. Additionally, it should be further appreciated that the methods can be implemented on an article of manufacture (e.g., a low voltage circuit) to facilitate transporting and transferring the methods.

Referring now to FIG. 6, illustrated is a schematic process flow diagram of a method for multiplexing and demultiplexing data streams. Method 600 can begin at 602, where a first set of data streams are received. The first set of data streams can be received at a clock data recovery circuit and demultiplexer. The CDR circuit can detect the phase and data rate of the data streams to generate the recovered clock. In some embodiments, the CDR circuit can receive ten data inputs, and in other embodiments, the CDR circuit can receive four data inputs.

At 604, a first set of data streams can be directed through a high frequency analog domain data path in a normal mode. The analog domain data path can include a FIFO that transitions the data from a plurality of recovered clock domains to a common or data output clock domain. Data path logic in the analog domain data path can also reorder a number of packets with lines into a second number of packets with a different number of lines.

At 606, a data stream that requires substantial digital processing (or processing beyond a predefined threshold) can be passed to a digital core data path. The digital core data path can be powered up when data streams are passed through it, and subsequently powered down at other times, when it is not in use. Deskewing of the data stream as well as calibration and other diagnostic test can be performed while the data stream is in the digital core data path. The digital core data path can then send any outputted data stream back to the analog domain data path, or a multiplexer.

At 608, the second set of data streams are outputted from the analog domain data path and subsequent multiplexer, wherein the number of streams in the first set of data streams and the second set of data streams are different. In some embodiments, the second set of data streams can be fewer than the first set of data streams, and in other sets the number of data streams in the second set can be larger than the first set.

Turning now to FIG. 7, a schematic process flow diagram of a method 700 for deskewing data streams, according to an implementation of the subject disclosure is shown. At 702, an indication that a deskew mode bit is turned on is received. At 704, the digital core data path can be activated in response to a deskew mode bit being turned on. Under normal mode operations, the digital core data path, and components thereon can be powered down to save energy. When a deskew mode bit is activated, the digital core data path can be powered up and ready to receive the data streams for processing.

At 706, a set of data streams is passed from the analog domain data path to the digital core data path. This set of data streams can be tapped and demultiplexed after the FIFO structure and before the data path logic on the analog domain data path. The data streams can be returned by the digital core data path and multiplexed back up in data rate, after the deskewing is performed on the data streams.

The above description of illustrated implementations, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

As used herein, the phrase "data streams" refer to serial data without an associated clock outside the circuit, and within the circuit refer to single bit-width data and/or multi-bit data buses both with or without an associated clock line.

As used herein, the word "example" is used herein to mean serving as an example, instance, or illustration. For the avoidance of doubt, the subject matter described herein is not limited by such examples. In addition, any aspect or design described herein as an "example" is not necessarily to be construed as preferred or advantageous over other aspects or designs, nor is it meant to preclude equivalent structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In this regard, while the described subject matter has been described in connection with various implementations and corresponding figures, where applicable, it is to be understood that other similar implementations can be used or modifications and additions can be made to the described implementations for performing the same, similar, alternative, or substitute function of the disclosed subject matter without deviating therefrom. Therefore, the disclosed subject matter should not be limited to any single implementation described herein, but rather should be construed in breadth and scope in accordance with the appended claims.

What is claimed is:

1. A circuit, comprising:
a set of clock data recovery circuits and demultiplexers that receives data streams;
a digital core data path with an analog multiplexer and demultiplexer; and
an analog domain data path that bypasses the digital core data path and sends the data streams to a multiplexer with a higher data rate data output, wherein in response to the analog domain data path being used in a normal mode, the digital core data path is powered down.

2. The circuit of claim 1, wherein the analog domain data path is implemented using at least one of static CMOS, SCL, ECL, or BiCMOS.

3. The circuit of claim 1, wherein the analog domain data path includes a FIFO structure that transitions data from their respective recovered clock domains to a data output clock domain.

4. The circuit of claim 3, wherein the FIFO structure absorbs wander between receive and transmit channels, wherein the FIFO structure is operated at a low divide ratio.

5. The circuit of claim 1, wherein power is reduced in response to clock and data gating based on a mode of the analog domain data path.

6. The circuit of claim 3, wherein a data stream to the digital core data path is tapped and demultiplexed after passing through the FIFO structure.

7. The circuit of claim 1, wherein a latency of the circuit is decreased based on a high frequency sequential data operation.

8. The circuit of claim 1, further comprising a diagnostic component on the digital core data path that performs chip and link diagnostics on a data stream.

9. The circuit of claim 1, wherein there are a higher number of input data streams than output data streams.

10. The circuit of claim 1, wherein the analog domain data path is surrounded by the analog multiplexer and demultiplexer.

11. The circuit of claim 1, wherein a non-power of two data path mapping logic is included in the analog domain data path and non-power of two multiplexing is included in the analog multiplexer in place of a memory based gearbox in a digital domain.

12. A circuit, comprising:
a set of clock data recovery circuits and demultiplexers that receives input data streams;
a digital core data path with an analog multiplexer and demultiplexer; and
an analog domain data path that bypasses the digital core data path and sends the data streams to a multiplexer that outputs the data streams at a lower data rate than the input data streams, wherein in response to the analog domain data path being used in a normal mode, the digital core data path is powered down.

13. The circuit of claim 12, wherein the digital core data path is activated anda data stream is passed to a deskew component in a digital core in response to a deskew mode bit being turned on.

14. The circuit of claim 12, wherein the analog domain data path is implemented using at least one of low power static CMOS, MOS, or bipolar CMOS.

15. The circuit of claim 12, wherein the analog domain data path includes a FIFO structure that transitions data streams from respective recovered clock domains to a data output clock domain, and wherein the FIFO structure is operated at a low divide ratio of the input data to add a minimum amount of skew between receive channels while treating all receive channels independently.

16. The circuit of claim 15, wherein a data stream to the digital core data path is tapped and demultiplexed after passing through the FIFO structure.

17. The circuit of claim 12, further comprising a diagnostic component on the digital core data path that performs chip and link diagnostics on a data stream.

18. The circuit of claim 12, wherein there are a higher number of output data streams than input data streams.

19. The circuit of claim 12, wherein non-power of two demultiplexing is included in the analog demultiplexer and non-power of two data path mapping logic is included in the analog domain data path in place of a memory based gearbox in a digital domain.

20. A method comprising:
receiving a first set of data streams at a set of clock data recovery circuits and demultiplexers;
directing the first set of data streams through an analog domain data path;
passing a data stream that requires digital processing above a predefined threshold to a digital core data path, wherein the digital core data path is powered down when not in use; and
outputting a second set of data streams from the analog domain data path and a multiplexer wherein a data rate of the second set of data streams is different than a data rate of the first set of data streams.

* * * * *